UNITED STATES PATENT OFFICE.

E. N. HORSFORD, OF CAMBRIDGE, MASSACHUSETTS, ASSIGNOR TO JOHN H. CHEEVER, OF NEW YORK, N. Y.

IMPROVEMENT IN THE PREPARATION OF A PHOSPHATE OF LIME FOR CULINARY AND OTHER PURPOSES.

Specification forming part of Letters Patent No. 41,815, dated March 1, 1864.

*To all whom it may concern:*

Be it known that I, EBEN NORTON HORSFORD, of Cambridge, in the county of Middlesex and State of Massachusetts, have invented a new and useful Preparation of Phosphate of Lime; and I do hereby declare that the following is a full and exact description thereof.

The object of my invention is to produce a non-hygroscopic pulverulent phosphate of lime of acid reaction for use in the culinary preparations of farinaceous food, and for other desired purposes in the arts.

In my Letters Patent of April 23, 1856, I described an invention of what I called "pulverulent phosphoric acid," which was substantially a monobasic phosphate of lime mixed with free phosphoric acid, consisting as a whole of about one atom of lime and two atoms of phosphoric acid mixed with flour and starch to increase its extent of surface and retard its chemical action, and dried at an elevated temperature to render it brittle. In this preparation the free phosphoric acid—that is, the acid above the ratio of one atom of acid to one of base—exerted constant affinity for moisture and rendered the preparation unsuited to certain important offices in the arts.

I have recently perfected another invention of what I call a "double phosphate of lime," in which the number of atoms of base is equal to or slightly in excess of the number of atoms of acid, which is of permanent chemical constitution, and does not absorb appreciable moisture from ordinary atmospheric air.

"The pulverulent phosphoric acid," thus so called, contains free and uncombined phosphoric acid. This double phosphate contains none. The former, without the addition of farinaceous or other equivalent diluting and drying substances, is a more or less viscid mass. The double phosphate is of itself a hydrated crystalline solid.

I prepare the double phosphate as follows: To five thousand pounds of water I add five hundred pounds of oil of vitriol. To this mixture I add, with constant stirring, seven hundred pounds of burned bones, and continue brisk agitation for from sixteen to eighteen hours, when the whole is drawn into a suitable leach and thoroughly lixiviated. The result is that I have produced by this process and these proportions a liquid acid phosphate of lime, in which about two-ninths of the lime of the original phosphate of lime remain in combination with the acid. This extract is concentrated in suitable vessels, and as the evaporation proceeds I add pure carbonate of lime in the proportion of eighteen-thousandths of a pound avoirdupois for each degree of Baumé of every wine-gallon, and carry on the concentration till the whole becomes a thick emulsion of crystals. In place of carbonate of lime, I sometimes take an equivalent weight—to wit, one-hundredth of a pound—of caustic lime, slake it and add it to the boiling liquor. I also employ, in place of the carbonate of lime, finely-ground, thoroughly-calcined bones in the proportion of four-hundredths of a pound for each degree of Baumé of every wine-gallon. In the latter case the concentration is continued till the powdered bone ceases to be perceptible between the thumb and finger and the liquid assumes a creamy consistency. The essential body produced by either of these processes is a white crystalizable compound of lime and phosphoric acid, which, on cooling, solidifies and may be exposed to ordinary atmospheric air indefinitely long without deliquescing. It is a new composition of matter, in which, by the humid process, I obtain a stable hydrated crystalline phosphate of lime, in which the phosphoric acid is combined with lime in the proportion of somewhere between three atoms of phosphoric acid to four atoms of lime and four of phosphoric acid to four of lime, and which, on the addition of water, is resolved into two phosphates—one insoluble in water, and the other soluble and acting as an acid in the neutralization of alkalies. The proportions of the agents employed are subject to a slight variation, but as an ordinary rule of manufacture in a large way, experiment has shown these proportions to give satisfactory results.

This crystalline double phosphate of lime is too concentrated for convenient use in the arts. The crystals are aggregated into groups, and the mass is more or less tough. To give the desired increased extent of surface, render it non-hygroscopic, preserve its homogeneity, and facilitate its reduction to powder, I proceed as follows: Just before the liquid is resolved into an emulsion of crystals, when carbonate of lime or quicklime is employed, or, in the case of using white bones, when the mass has assumed the viscid or creamy consistency it is removed from the fire, slightly diluted with gelatinized water, (made such by the addition of about three per cent. of starch, which is first moistened with cold water and then stirred into boiling water,) and occasionally agitated several hours to secure slow crystallization. Coat each crystal with gelatinized starch and prevent aggregation. When the mass has become cool, for each degree of Baumé of each gallon of the original liquid I take for the mass, which has been heated with carbonate of lime, eighty-two thousandths of a pound of dry, thoroughly-washed potato-starch and intimately incorporate it, adding, if necessary, gelatinized water from time to time, until no dry starch grains are visible. If quicklime is used, nine hundredths of a pound of starch would be required. If white bones, I take seven hundredths of a pound of starch. The mass is then spread on a floor in parcels of about a quarter of a cubic foot bulk each, and allowed spontaneously to dry, in a moderately-warm room, for several days. When sufficiently dry to crumble readily it is granulated by passing through a sieve of quarter-inch meshes and spread out in a current of heated air of a temperature graduated from 110° to 150° Fahrenheit. When thoroughly dried it may be ground and bolted, and is ready for certain uses. This gives a diluted double phosphate, of which one hundred parts will neutralize twenty-one of hydrate of soda. If weaker phosphate is required, more starch may be added; if a stronger, less starch will be required. Instead of starch, I have employed equivalent farinaceous or other diluents—such as wheaten flour, corn-starch, rice-flour, gypsum, &c., for certain purposes. Where it is desired to mix the double phosphate with sensitive chemical compounds liable to decomposition on the absorption of moisture, as with bicarbonate of soda, for example, I sometimes treat the double phosphate, dried and ground, as above described, as follows: To more effectually remove the hygroscopic property due to starch incorporated with the double phosphate, I thoroughly knead the dried and ground diluted double phosphate, prepared as above, with a weak preparation of boiled starch until every particle of the powder is coated with the gelatinized water, and again dry and grind it, by which process the hygroscopic quality is nearly or quite destroyed, the powder being coated throughout with a thin non-hygroscopic and almost insoluble varnish.

To render my invention available in the culinary preparation of farinaceous food, and at the same time restore to the flour of cereals the phosphates that have been separated with the bran in the process of bolting, I proceed as follows:

It is well known that the essential and most valuable principle of leaven or yeast is the provision of a source of carbonic acid throughout the mass of moistened flour. As the carbonic acid is evolved the paste is distended and becomes elastic and porous dough. In ordinary leaven the source of carbonic acid is decaying gluten or albumen and decomposing sugar.

The carbonic acid may be evolved from a mixture of solid acid, as tartaric acid or cream-tartar, for example, in the form of powder, and bicarbonate of soda distributed throughout the flour on the addition of water. I employ for this purpose as the solid acid my double phosphate of lime.

In the preparation of self-raising flour I proceed as follows: I take two pounds of double phosphate, (of a strength that twenty parts will neutralize nine parts of bicarbonate of soda,) nine-tenths of a pound of bicarbonate of soda, and one hundred pounds of flour. These are mixed as follows: First, the double phosphate is mixed with the flour and bolted, then the soda is added, and the whole is mixed and bolted again. This mixture is self-raising flour, and requires only the addition of salt and water to be resolved into dough, ready for baking.

I also employ the double phosphate as follows: I take the double phosphate and its equivalent, bicarbonate of soda, in twin parcels of equal value, the double phosphate in one and the soda with the requisite salt and the remainder of the volume of starch in the other. The cook then takes equal measures from each parcel and a number of tea-spoonfuls, for example, proportioned to the quantity of flour to be used. I also employ it as follows: I take the double phosphate above mentioned and its equivalent, bicarbonate of soda, in separate parcels, but in one package in quantity suited to given weights of flour, according to the proportions mentioned under the first method. The contents of the separate parcels may be mixed and sifted with the proportional quantity of flour whenever and wherever self-raising flour is required. I also employ it as follows, adapting it to general use for culinary purposes: I mix the double phosphate rendered specially non-hygroscopic, as above described, and its equivalent of bicarbonate of soda, both thoroughly dry in air-tight bottles or boxes. This mixture may be added to the flour and salt as a yeast-powder or baking-powder, and the whole sifted and mixed with water and baked. I also employ it generally in the arts for neutralizing alkalies wherever a pulverulent acid may be required.

The body prepared as above described I call "double phosphate of lime."

What I claim, and desire to secure by Letters Patent of the United States, is—

This double phosphate of lime of the composition and preparation substantially as above described, for the uses above set forth.

E. N. HORSFORD.

Witnesses:
H. H. STIMPSON,
FRANCIS L. CHAPMAN.